US012454321B2

(12) United States Patent
Kübler et al.

(10) Patent No.: US 12,454,321 B2
(45) Date of Patent: Oct. 28, 2025

(54) KING PIN ARRANGEMENT AND BEND ANGLE MEASURING SYSTEM

(71) Applicant: SAF-HOLLAND GmbH, Bessenbach (DE)

(72) Inventors: Randy Kübler, Gottmadingen (DE); Mario Sebastian Köster, Bodman-Ludwigshafen (DE); Daniel Müller, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 712 days.

(21) Appl. No.: 17/753,807

(22) PCT Filed: Nov. 23, 2020

(86) PCT No.: PCT/EP2020/083034
§ 371 (c)(1),
(2) Date: Mar. 15, 2022

(87) PCT Pub. No.: WO2021/115768
PCT Pub. Date: Jun. 17, 2021

(65) Prior Publication Data
US 2024/0043074 A1 Feb. 8, 2024

(30) Foreign Application Priority Data
Dec. 11, 2019 (DE) .................... 10 2019 134 012.8

(51) Int. Cl.
*B62D 53/08* (2006.01)
*G01B 7/008* (2006.01)
*G01B 21/22* (2006.01)

(52) U.S. Cl.
CPC ......... *B62D 53/0842* (2013.01); *G01B 7/008* (2013.01); *G01B 21/22* (2013.01)

(58) Field of Classification Search
CPC ..... B62D 53/0842; G01B 7/008; G01B 21/22
See application file for complete search history.

(56) References Cited

U.S. PATENT DOCUMENTS

| 5,536,030 | A | * | 7/1996 | Bettini | B62D 13/06 |
| | | | | | 280/433 |
| 6,534,970 | B1 | * | 3/2003 | Ely | G01D 5/2086 |
| | | | | | 324/207.17 |

(Continued)

FOREIGN PATENT DOCUMENTS

| DE | 202012008717 U | 12/2013 |
| EP | 2815950 B1 | 8/2016 |

OTHER PUBLICATIONS

European Patent Office; International Search Report; Jan. 22, 2021; entire document.

*Primary Examiner* — Minnah L Seoh
*Assistant Examiner* — Marlon A Arce
(74) *Attorney, Agent, or Firm* — Price Heneveld LLP

(57) ABSTRACT

A king pin arrangement includes a king pin and a mounting member, the mounting member comprising a receiving plate, the king pin having a base section and a king pin head, the king pin extending in a king pin direction, wherein a positive king pin direction points from the base section to the king pin head, wherein the king pin is fastened directly and/or indirectly to the mounting element by the base section in a form-fitting, force-fitting and/or material-fitting manner, the king pin being fastened such that the king pin is rotationally fixed to the mounting element in a circumferential direction about the king pin direction, wherein the mounting element and/or the king pin has a first measuring surface which has a continuous height profile along an extension of the remaining surface in the direction of the king pin direction.

18 Claims, 3 Drawing Sheets

(56) References Cited

U.S. PATENT DOCUMENTS

| | | | |
|---|---|---|---|
| 11,643,154 B2* | 5/2023 | Grossman | B62D 53/0842 |
| | | | 701/23 |
| 11,927,676 B2* | 3/2024 | Record | G01B 11/26 |
| 2002/0070520 A1* | 6/2002 | Osborn | B62D 15/023 |
| | | | 280/93.512 |
| 2007/0216134 A1 | 9/2007 | Padula | |
| 2013/0082453 A1 | 4/2013 | Padula | |
| 2018/0208423 A1* | 7/2018 | Yoon | H02J 7/02 |

* cited by examiner

KING PIN ARRANGEMENT AND BEND ANGLE MEASURING SYSTEM

BACKGROUND OF THE INVENTION

The invention relates to a king pin arrangement and a buckling angle measurement system.

King pin arrangements are already known from the prior art. These are used to be arranged on a trailer. The king pin of the king pin arrangement is designed to enter a fifth wheel coupling and to be coupled there in order to be able to transmit forces between the trailer and the towing vehicle during operation. This king pin coupling allows the trailer to rotate about the king pin relative to the towing vehicle, while at the same time safely transmitting high forces between the towing vehicle and the trailer via the king pin. Knowledge of the angle around the vertical axis between the towing vehicle and the trailer, also known as the buckling angle, is of particular interest. For example, in certain situations a critical driving condition can be detected at an early stage if the buckling angle is known. The systems known in the state of the art are mostly based on the use of magnets, whereby these measuring systems, however, sometimes show strong measuring errors due to the metallic components in the area of the king pin. In addition, the measuring systems known from the prior art also have a high space requirement.

It is therefore an object of the present invention to enable a compact and reliable measurement of a buckling angle.

SUMMARY OF THE INVENTION

According to the invention, a king pin arrangement comprises a king pin and a mounting element, wherein the mounting element is, in particular, a receiving plate, wherein the king pin has a base section and a king pin head, wherein the king pin extends in a king pin direction, wherein the positive king pin direction points from the base section to the king pin head, wherein the king pin is fastened directly and/or indirectly to the mounting element by means of the base section in a form-fitting, force fitting and/or material-fitting manner via the base section, the king pin being fastened in such a way that the king pin is rotationally fixed to the mounting element in a circumferential direction about the king pin direction, the mounting element and/or the king pin having a first measuring surface which has a continuous height profile along its extension in the direction of the king pin direction. The king pin arrangement is intended to be attached to a commercial vehicle trailer. In particular, the king pin arrangement is part of an buckling angle measurement system which serves to determine the buckling angle between the commercial vehicle trailer and a towing vehicle. A commercial vehicle trailer within the meaning of the invention is in particular a trailer which has a permissible total mass of at least 7.51 t, preferably of at least 10.1 t and particularly preferably of at least 15.1 t and especially strongly preferred of at least 20.1 t. The king pin arrangement has a king pin. This king pin is used to be couplable to a fifth wheel assembly to transmit towing and/or other forces between the trailer and a towing vehicle in the coupled state. The king pin has a base section and a king pin head. The king pin head is in particular that part of the king pin which forms a first distal end section of the king pin in the direction of the king pin direction, whereby this end section is formed as a free ending end section. The base section of the king pin, on the other hand, forms in particular the end section in the king pin direction, which is formed opposite the king pin head. The base section is fastened indirectly and/or directly to the mounting element in a form-fitting, force-fitting and/or material-fitting manner. This fastening is effected in such a way that the king pin is rotationally fixed to the mounting element in the circumferential direction about the king pin direction. In other words, this can mean that a relative rotation between the king pin and the mounting element is prevented by the fastening. This relative rotation or the fastening of the king pin by means of its base section to the mounting element is thereby advantageously effected in a force-fitting and form-fitting manner in order to prevent a relative rotation. This is particularly important because a purely force-fitting connection tends to allow at least certain micro-movements. The king pin itself is advantageously designed in such a way that it is at least partially rotationally symmetrical about the king pin direction. Advantageously, the king pin is—at least partially—designed to be essentially rotationally symmetrical about the king pin direction, whereby "essentially rotationally symmetrical" in this context means that, for example, assembly openings and/or weld seams or manufacturing inaccuracies may be present, which, however, cannot destroy the rotational symmetry in the sense of "essentially rotationally symmetrical". The mounting element of the king pin arrangement serves to fix the king pin relative to the trailer. In particular, the mounting element may advantageously be a receiving plate. A receiving plate is characterised in particular by the fact that it has an outer rotationally symmetrical shape. The mounting element and/or the king pin has or have a first measuring surface. In other words, the first measuring surface can therefore form a part of the mounting element and/or a part of the king pin. This first measuring surface has a continuous height profile along its direction of extension in the direction of the king pin. A continuous height profile in the direction of the king pin direction can mean in this context that along the extension of the measuring surface it is formed in an ascending or descending manner in the direction of the king pin direction—depending on the direction of travel along the extension direction. In other words, this can mean that the measuring surface is designed in such a way that between a first end point of the measuring surface and a distally opposite end point of the measuring surface in the direction of extension, all other points of the measuring surface lie continuously in the king pin direction between these end points. For example, the measuring surface can therefore be a kind of inclined plane. Alternatively, the measuring surface can also be spiral-like around the king pin. Advantageously, the measuring surface has at least one surface area which is at least 4 $cm^2$, preferably at least 8 $cm^2$ and particularly strongly preferred 16 $cm^2$, whereby all parts of this surface area have a continuous height gradient in the direction of the king pin. The measuring surface is intended in particular to interact with a measuring sensor. Due to the continuous height profile in the direction of the extension of the measuring surface, a rotation of the king pin arrangement about the king pin direction in the circumferential direction can be detected in an effective manner via a sensor. The king pin arrangement according to the invention is therefore able to provide a space-saving measurement method due to its compact design, which enables a reliable measurement of the buckling angle between the trailer and the towing vehicle.

Preferably, the first measuring surface extends in an angular range around the king pin direction in the circumferential direction, whereby the angular range is preferably at least 90°, particularly preferably at least 150° and, especially preferably at least 180°. The decisive angle for determining the angular range around the king pin direction is the straight enclosing angle of the first measuring surface in the direction of the circumferential direction starting from the king pin direction. An angular range of at least 90° results in a particularly compact measuring surface. An angular range of at least 150° results in a particularly reliable measurement of the kick angle, because the buckling angle between the towing vehicle and the trailer is often in a range greater than 75°. With an angular range around the king pin direction in the circumferential direction of at least 180°, the king pin arrangement is also able to provide critical measuring angles, especially if a critical situation occurs between the towing vehicle and the trailer. Alternatively, the measuring surface can also extend completely around the king pin direction in the circumferential direction. In such a design, the measuring surface can form a closed ring around the king pin direction, the centre of which lies in particular on the king pin direction. The complete enclosure of the king pin by the measuring surface results in a king pin arrangement that is particularly easy to manufacture. In particular, the height difference of the measuring surface in mm per extension angle in ° around the king pin direction in the circumferential direction is in a range of 0.1 mm/° to 0.3 mm/° and especially preferably in a range of 0.15 mm/° to 0.25 mm/°. The ratio of the height difference of the measuring surface to the extension angle is therefore a kind of gradient indication of the measuring surface. A ratio of 0.1 mm/° to 0.3 mm/° results in a measuring surface that is particularly easy to produce. A ratio in the range of 0.15 mm/° to 0.25 mm/° results in a particularly good compromise between measuring resolution and space requirements.

In an advantageous embodiment, the ratio of the maximum height difference of the first measuring surface to the maximum angular range lies in a range of 0.025 mm/° to 0.5 mm/°, particularly preferably in a range of 0.1 mm/° to 0.3 mm/° and especially strongly preferably in a range of 0.15 mm/° to 0.25 mm/°. The maximum height difference of the measuring surface is in particular the difference between the highest point of the measuring surface and the lowest point of the measuring surface in the king pin direction. In other words, this can mean that the height difference is the maximum height difference of the measuring surface in the direction of the king pin. With a ratio in the range of 0.025 to 0.5 mm/°, a particularly compact king pin arrangement can be achieved. A ratio in the range of 0.1 to 0.3 mm/° results in a particularly easy-to-manufacture king pin arrangement. Surprisingly, the applicant has found that a ratio in the range of 0.15 to 0.25 mm/° results in a particularly good compromise between the measuring resolution and the space requirement of the king pin arrangement.

Preferably, the first measuring surface extends in the circumferential direction. By "extending in the circumferential direction" it is to be understood that the first measuring surface is formed in the shape of a bow, in particular in the shape of a segment of a circle around the king pin direction in the circumferential direction. This is preferably the case when the measuring surface has a constant distance to the king pin direction along its course. By forming the measuring surface in the circumferential direction in this way, it can be achieved that the distance of the measuring surface from the king pin direction is constant, so that when the king pin arrangement is rotated about the king pin direction in the circumferential direction, a measuring sensor that interacts metrologically with the measuring surface does not have to be displaced or relocated in order to continue to interact metrologically with the measuring surface in order to provide reliable measured values.

Advantageously, the first measuring surface has a width of at least 2 mm, preferably at least 4 mm. The width of the measuring surface is the extension of the measuring surface perpendicular to the direction of extension. In other words, the width is the shorter extension of the measuring surface. By providing a measuring surface which has a width of at least 4 mm, the measuring reliability of the buckling angle measurement system in which the king pin arrangement is to be installed can be increased.

Preferably, the first measuring surface forms an end face of a measuring projection. In particular, the end face is the surface of the measuring projection that borders the measuring projection—as seen in the direction of the king pin. This type of design can increase the accessibility of the measuring surface so that the measuring accuracy can be increased. The measuring projection can, for example, extend from a base surface. This base surface advantageously has a normal which is parallel to the direction of the king pin. For example, this base surface can form a part of the mounting element or a part of the king pin, in particular the base surface can be part of the king pin head. Advantageously, the measuring projection is designed in such a way that the base surface completely surrounds the measuring projection. This makes it possible, for example, to quickly detect an incorrect measurement if a measuring sensor "accidentally" does not interact with the measuring surface, but with the base surface.

In an advantageous embodiment, the measuring projection is formed integrally with the king pin or the measuring projection is formed integrally with the mounting element. This one-piece design of the measuring projection with the king pin or with the mounting element can effectively prevent relative rotation between the measuring projection and the king pin or between the measuring projection and the mounting element in a space-saving and cost-effective manner. Such a relative rotation is to be prevented in particular because this would lead to a falsification of the buckling angle measurement.

In an advantageous further embodiment, the measuring projection extends from a base surface, the base surface having a normal which is at least substantially parallel to the king pin direction. This results in a particularly easy to manufacture and therefore cost-effective king pin arrangement. Two directions are essentially parallel in particular when these directions form an angle of at most 4°, preferably 2° and particularly strongly preferred at most 1° to each other.

Advantageously, the ratio of the maximum height difference of the first measuring surface to the minimum diameter of the king pin lies in a range of 0.03 to 0.3, particularly preferably in a range of 0.06 to 0.25 and especially strongly preferred in a range of 0.09 to 0.22. The minimum diameter of the king pin is therefore the smallest outer diameter of the king pin between the base section and the king pin head. A ratio between the maximum height difference of the first measuring surface and the minimum diameter of the king pin in the range of 0.03 to 0.3 results in a particularly reliable measurability of the buckling angle. If the ratio of the maximum height difference of the first measuring surface to the minimum diameter of the king pin is in the range of 0.06 to 0.25, this results in a particularly simple production of the measuring surface, so that a particularly cost-effective king pin arrangement results. With a ratio in the range of 0.09 to 0.22, the applicant has surprisingly found that a particularly good compromise can be achieved between a compact arrangement and a high measuring accuracy of the buckling angle.

Advantageously, the mounting element and/or the king pin has a second measuring surface, which advantageously has a continuous height profile along its extension in the direction of the king pin direction and/or wherein the second measuring surface can have the same features as the first measuring surface. In other words, the second measuring surface may have a similar or even the same design as the first measuring surface. However, the first measuring surface and the second measuring surface are in particular clearly arranged or formed indistinguishably from each other, so that in particular the second measuring surface cannot be a continuous further development of the first measuring surface. In other words, this can mean that there is, for example, a gap, a recess and/or a bend which clearly separates the first and second measuring surfaces from each other. It can be advantageous that both the mounting element and the king pin each have a second measuring surface. The second measuring surface can, for example, be designed in such a way that it has a normal which is at least substantially parallel to the direction of the king pin. In this way, the second measuring surface can be used, for example, to serve as a kind of direction indicator. Alternatively, the second measuring surface can also have a continuous height profile in the direction of the king pin. In this way, the second measuring surface can, among other things, form a kind of reference surface or control surface, which serves to provide a reference value in comparison to the value of the measurement including the first measuring surface. Therefore, the second measuring surface can provide a kind of control measurement capability. It should also be noted in this context that both the mounting element and the king pin may have more than one first and second measuring surface. In other words, this means that both the mounting element and the king pin can have further measuring surfaces, whereby these measuring surfaces can, in particular, have the same measuring surface features of the first and/or the second measuring surface as already described and still to follow.

In an advantageous embodiment, the first measuring surface and the second measuring surface each form a end face of the measuring projection. In other words, this can mean that the measuring projection has two different measuring surfaces. Advantageously, the measuring projection is designed in such a way that each end face of the measuring projection in the king pin direction is formed by the first measuring surface and/or by the second measuring surface.

In an advantageous further development, the first measuring surface and the second measuring surface are directly adjacent to each other. Two measuring surfaces are directly adjacent in particular if they have a common edge and/or are spaced a maximum of 3 mm apart. For example, a step or shoulder—seen in the direction of the king pin—can be provided between the directly adjacent first and second measuring surfaces. By providing such a step between the first or second measuring surface, an absolute angle, for example a zero angle, can be determined or recorded in a simple manner. This "absolute angle measurement" can also be carried out more easily due to the projection or step, in particular if the measurement is disturbed by impurities on the measuring surface.

In a preferred embodiment, the second measuring surface forms an end face of a second measuring projection. In other words, this can mean that the second measuring surface is not part of the first measuring projection, but forms an end face of a second measuring projection. Preferably, the second measuring surface is designed in such a way that it forms the entire end face of the second measuring projection. In other words, this can mean that the second measuring surface completely borders the second measuring projection in the king pin direction. By forming a second measuring projection having the second measuring surface, a particularly redundant measuring system can be achieved. Alternatively, these two different measuring projections can also be used to increase the relative measuring accuracy.

In a further preferred embodiment, the first measuring surface rises in the opposite direction to the second measuring surface. This makes it particularly easy to carry out a differential measurement in order to increase the accuracy of the buckling angle measurement. In this context, "oppositely rising" means that when the first measuring surface rises along its direction of extension, the second measuring surface—viewed in this direction—is designed to descend. For example, an "opposite" formation is given when the first measuring surface is formed in a circumferentially ascending manner in the (positive/negative) circumferential direction, whereby the second measuring surface—on the other hand—is formed in a descending manner in the (positive/negative) circumferential direction.

Preferably, the first measuring surface is further away from the king pin direction in a radial direction than the second measuring surface. The radial direction is the direction that points radially away from the king pin direction. In other words, the radial direction, the circumferential direction and the king pin direction can form a cylinder coordinate system, where the king pin direction indicates the height direction, the radial direction indicates the diameter direction and the circumferential direction indicates the circumferential direction of the cylinder coordinate system. Due to the further spacing of the first measuring surface relative to the king pin direction in comparison to the second measuring surface, it is possible for the two measuring surfaces to extend very far in the circumferential direction and to be arranged next to each other in the radial direction. In this way, the extension direction of the first measuring surface and the second measuring surface in the circumferential direction can be increased, so that the measurable angular range can be increased. A "further distance in the radial direction" means in particular that the smallest distance of the first measuring surface from the king pin direction in the radial direction is greater than the maximum possible distance of the second measuring surface from the king pin direction in the radial direction.

Another aspect of the invention relates to a buckling angle measurement system comprising a king pin arrangement as described above and below, a first measuring sensor and an evaluation unit, wherein the first measuring sensor interacts metrologically with the first measuring surface. The buckling angle measurement system has a measuring sensor and an evaluation unit, the measuring sensor interacting with the first measuring surface of the king pin arrangement in such a way that it is able to determine a buckling angle about the circumferential direction by measurement. For example, this measuring sensor can be attached to a towing vehicle. By "interacting metrologically" is to be understood in particular that the measurement signal is generated by the interaction of the measurement sensor with the measuring surface. For example, the measuring sensor can have a sensor in the direction of the king pin, which is pressed against the first measuring surface by mechanical means, such as a spring, and is displaced in the king pin direction by the continuous height profile of the measuring surface when the king pin arrangement is rotated. Basically, however, the measuring sensor can use a contacting and/or non-contacting measuring principle. A non-contact sensor can in particular be an optical sensor, such as a laser, which measures the buckling angle through metrological interaction, in particular in the form of a distance measurement to the measuring surface. The evaluation unit of the buckling angle measurement system serves to determine the buckling angle between the towing vehicle and the trailer on which the king pin arrangement is mounted, knowing the continuous height profile of the first and/or the second measuring surface of the king pin arrangement. The evaluation unit can, for example, be integrated into a control unit of the towing vehicle or the trailer. Alternatively, the evaluation unit can also be a separate element, which is arranged in the immediate vicinity of the measuring sensor, for example.

Preferably, the buckling angle measurement system comprises a second sensor, wherein the second measurement sensor interacts metrologically with the second measuring surface. In other words, this can mean that the first measuring sensor interacts with the first measuring surface and the second measuring sensor interacts with the second measuring surface. This enables a particularly safe and reliable determination of the buckling angle, because the second measuring surface can be used to determine a reference value and/or a second buckling angle value, so that the error rate of the measurement—by means of the first measuring surface—can be reduced. The second measuring surface can in particular be flat, whereby this second measuring surface can have a normal which is essentially perpendicular to the king pin direction. In particular, the first and second measuring surfaces are fundamentally non-displaceable relative to each other. In this context, "non-displaceable" means that the first and second measuring surfaces always have the same position relative to each other in a moving reference system, whereby possible wear phenomena are not to be taken into account in this position determination. In this way, in particular in the event of vertical lift-off or lift-off in the direction of the king pin and/or in the event of wear, the buckling angle can still be reliably determined, since the relationship of the measurements to each other—in relation to the first measuring surface and the second measuring surface—is not or only marginally affected by lift-off or wear, in particular of the fifth wheel coupling plate and/or parts of the king pin arrangement.

Advantageously, the second sensor serves as a reference sensor. Therefore, the second sensor can be used, for example, to determine incorrect measurements and/or to enable a wear-independent measurement by determining a reference measurement value.

Advantageously, the first or the second sensor is arranged and/or embedded on a fifth wheel coupling plate.

In an advantageous embodiment, the first measuring sensor and/or the second measuring sensor is a contactless sensor, in particular an inductive sensor. The use of a contactless sensor results in a particularly low-wear measurement of the buckling angle. Advantageously, the first and/or the second measuring sensor is an inductive, contactless sensor, in particular an inductive proximity switch. The advantage of an inductive proximity switch is that it provides reliable measured values even if the measuring surface(s) are heavily soiled.

In an advantageous further development, the first measuring sensor has a measuring distance from the first measuring surface, the ratio of the measuring distance to the maximum height difference of the first measuring surface being in a range from 0.2 to 1.05, preferably in a range from 0.4 to 0.95 and particularly preferably in a range from 0.5 to 0.9. The measuring distance is in particular the distance in the king pin direction from the measuring sensor to the highest point of the measuring surface in the king pin direction with which the measuring sensor interacts metrologically. In other words, this can mean that the measuring distance is the smallest possible distance between the measuring sensor and the measuring surface when the measuring sensor is located directly below the highest point of the measuring surface in the direction of the king pin. A ratio of the measuring distance in the direction of the king pin to the maximum height difference of the first measuring surface in the range of 0.2 to 1.05 results in a particularly reliable buckling angle measurement. A range of 0.4 to 0.95 results in a particularly compact measuring arrangement, so that valuable space can be saved in the area of the king pin arrangement. At a ratio in the range of 0.5 to 0.9, the applicant has surprisingly found that a particularly reliable measurement of the buckling angle can still be achieved despite heavy contamination, so that at a distance of 0.5 to 0.9 a contamination-insensitive measurement of the buckling angle is possible.

BRIEF DESCRIPTION OF THE DRAWINGS

Further advantages and features of the present invention will be apparent from the following description with reference to the figures. Individual features of the embodiments shown can also be used in other embodiments, unless this has been expressly excluded. It shows.

DETAILED DESCRIPTION OF THE PREFERRED EMBODIMENTS

Figure 1:
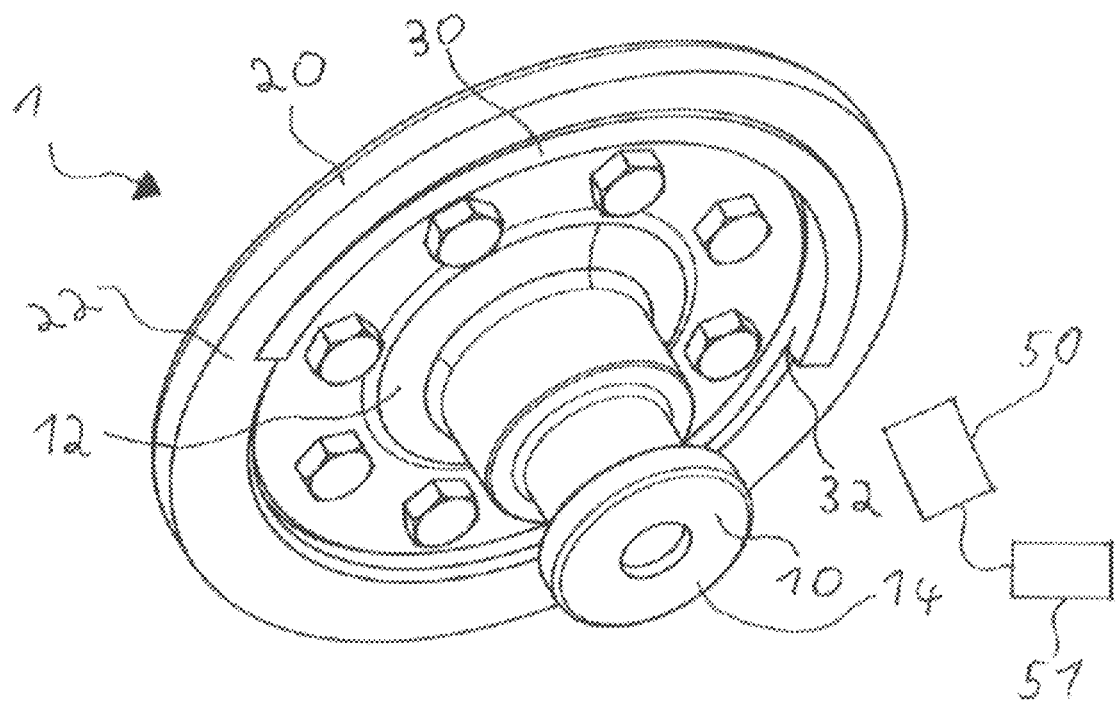
FIG. 1 is a perspective view of a king pin arrangement.

FIG. 1 shows a king pin arrangement 1 which has a king pin 10 and a mounting element 20 in the form of a receiving plate. The king pin 10 of the king pin arrangement 1 has a king pin head 14, which is formed as a freely extending end of the king pin 10. The base section 12 of the king pin 10 is frictionally, positively and materially secured to the mounting element 20. The mounting element 20 has a first measuring surface 30, which is formed entirely by the end face of the measuring projection 32. The first measuring surface 30 has a continuous height profile in the direction of the king pin R10, with the measuring projection 32 extending from a base surface 22 of the mounting element 20. A first measuring sensor 50 of the buckling angle measurement system described above interacts metrologically with the first measuring surface 30 of the mounting element 20. An evaluation unit 51 of the buckling angle measurement system serves to determine the buckling angle between the towing vehicle and the trailer on which the king pin arrangement is mounted.

Figure 2:
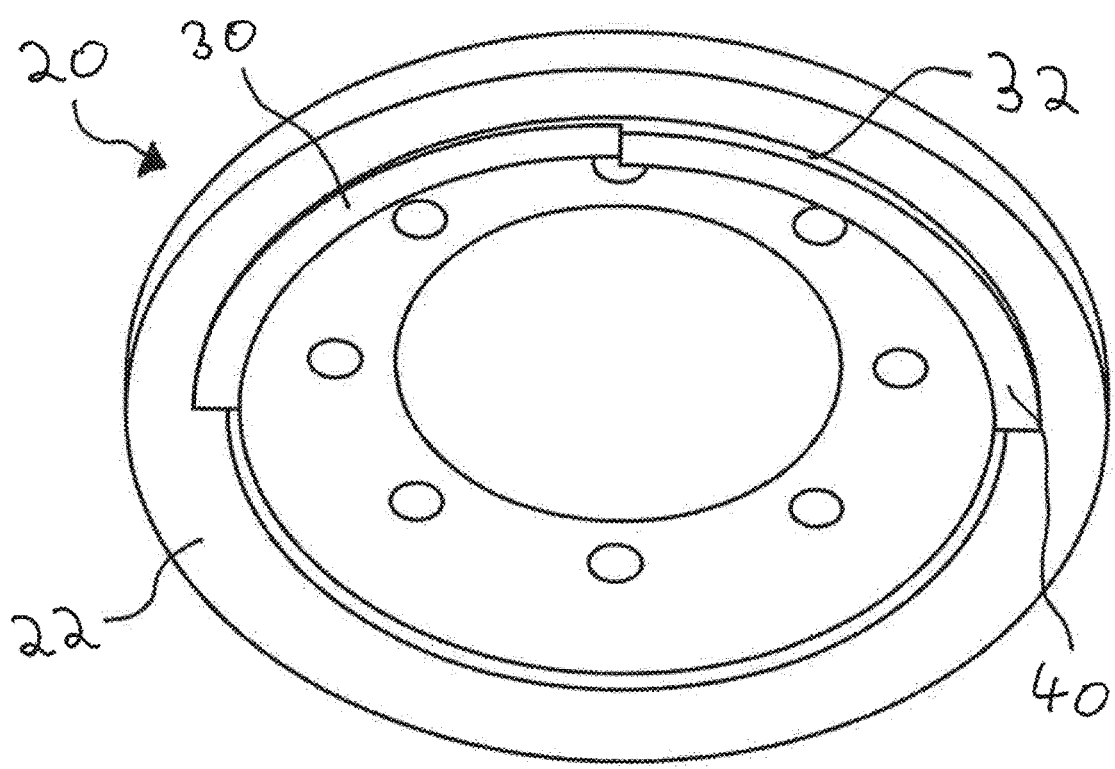
FIG. 2 is a mounting element of a king pin arrangement.

FIG. 2 shows a mounting element 20 which could in principle also be used in the king arrangement 1 shown in FIG. 1. The mounting element 20 has a measuring projection 32 whose end faces are formed by the first measuring surface 30 and the second measuring surface 40. Between the first measuring surface 30 and the directly adjacent second measuring surface 40 there is a shoulder which separates the first measuring surface 30 from the second measuring surface 40.

Figure 3:
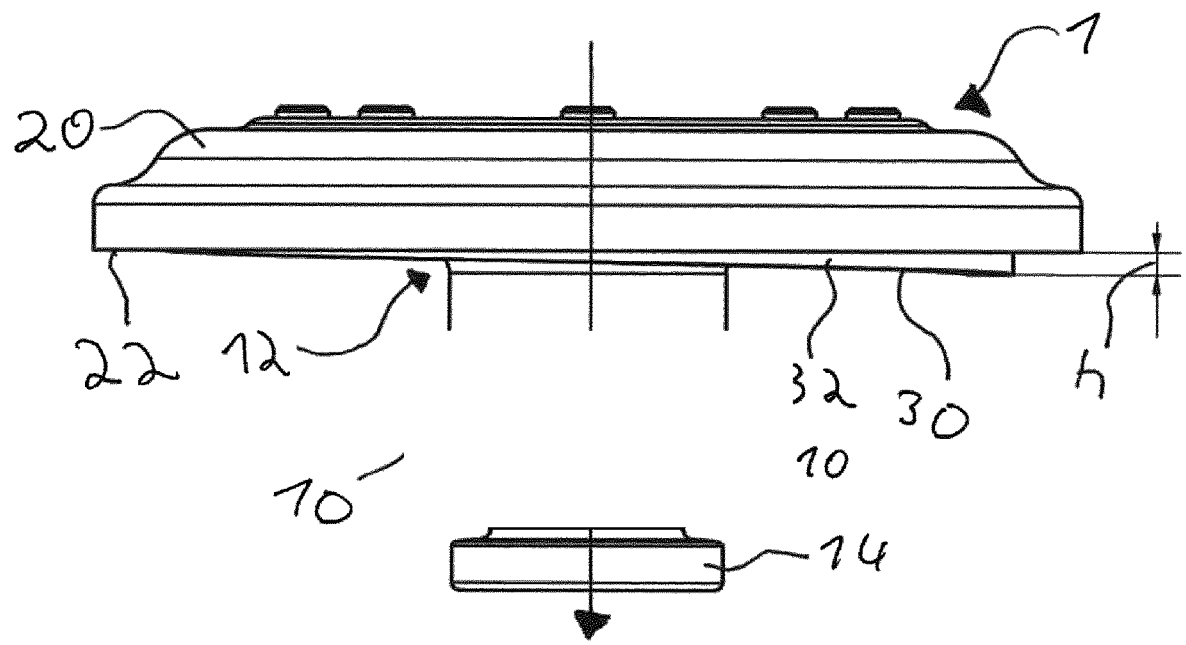
FIG. 3 is an external view of a king pin arrangement.

FIG. 3 shows a side view of a king pin arrangement 1. The king pin arrangement 1 also has a king pin 10 and a mounting element 20. In FIG. 3, the mounting element 20 is designed as a receiving plate. FIG. 3 shows the height difference h of the first measuring surface 30. The first measuring surface 30 forms an end face of the first measuring projection 32. The king pin 10 extends from its base section 12 in positive king pin direction R10. The distal end in the positive king pin direction R10 is formed by the king pin head 14 of the king pin 10.

Figure 4:
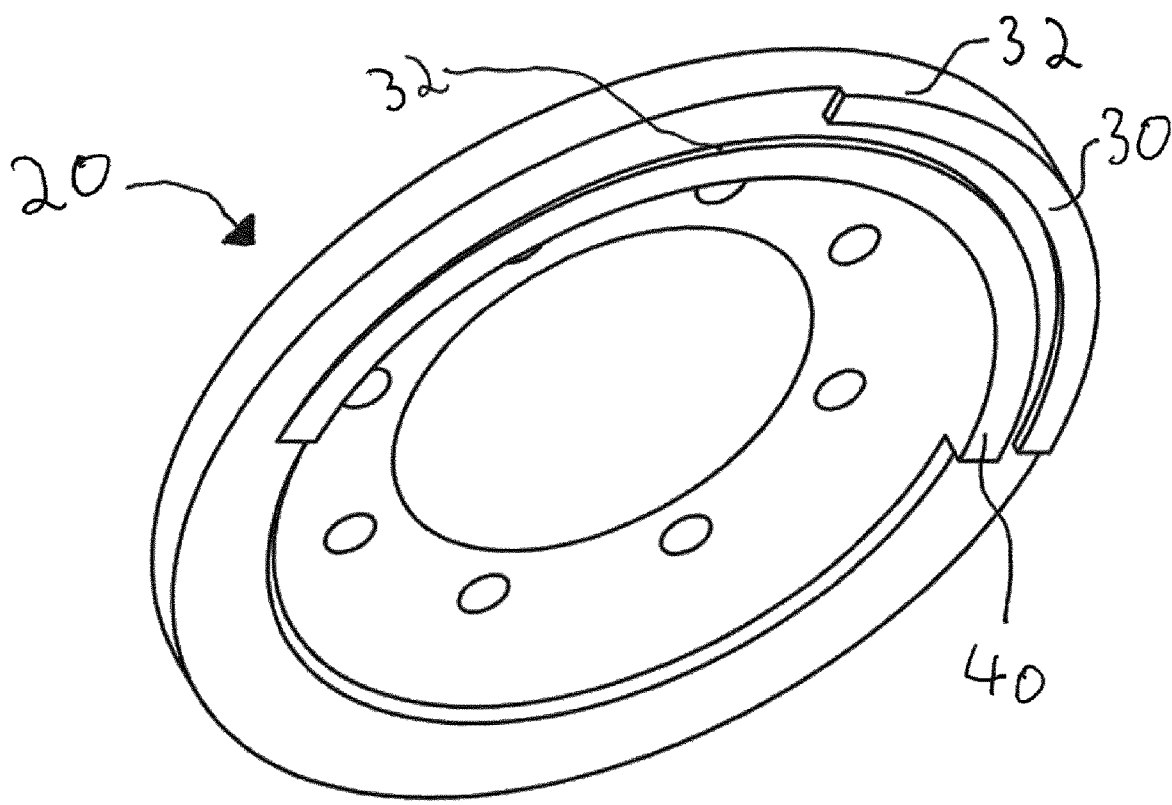
FIG. 4 is a further perspective view of a mounting element.

FIG. 4 shows an assembly element 20 which has two measuring projections 32. One measuring projection 32 has the first measuring surface 30 and the second measuring projection 32 has the second measuring surface 40. The measuring projections 32 are formed in such a way that the end faces of these measuring projections 32 are all formed by the first measuring surface 30 or by the second measuring surface 40.

Figure 5:
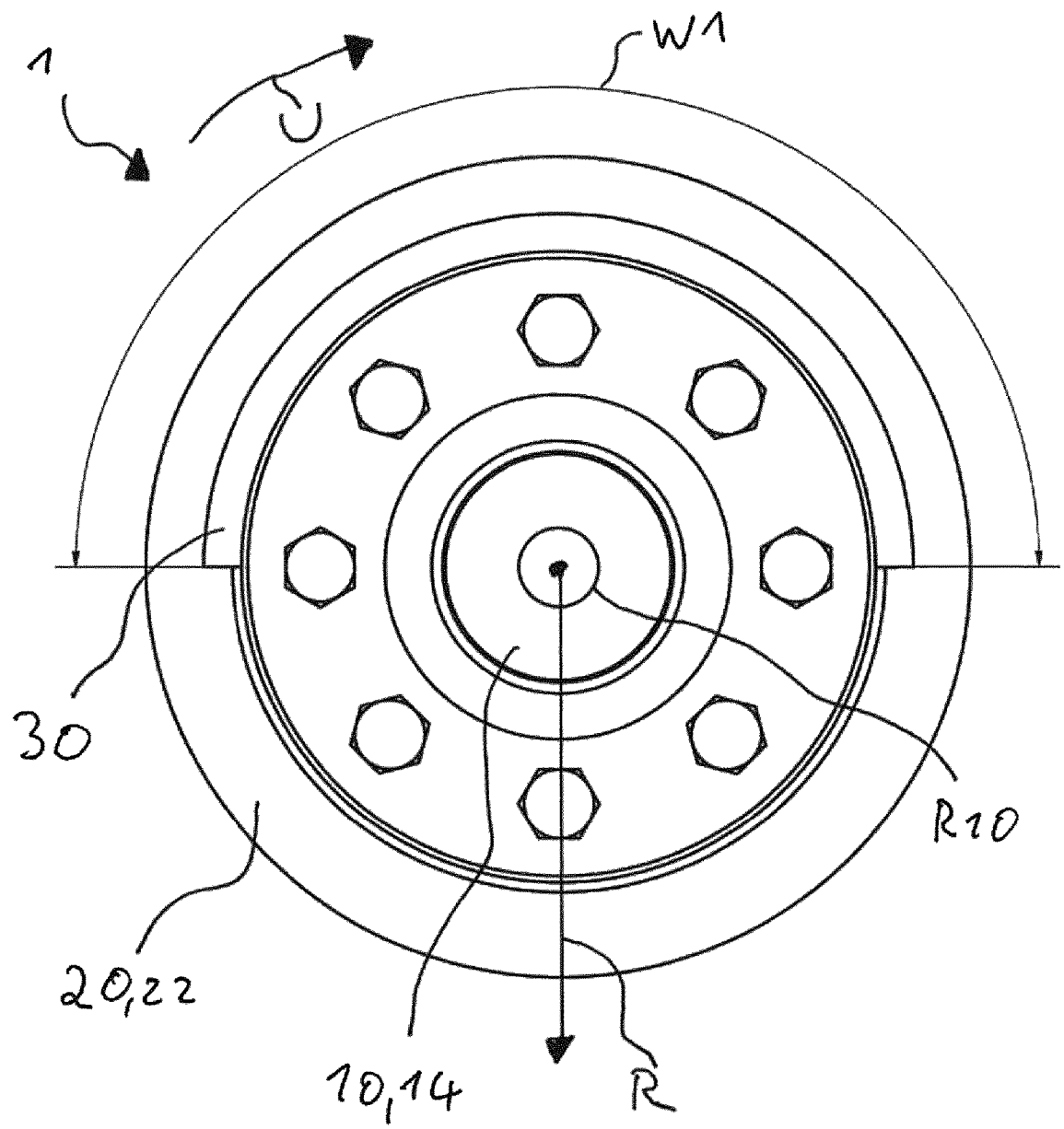
FIG. 5 is a view of a king pin arrangement in the king pin direction.

FIG. 5 shows another view of a king pin arrangement 1. FIG. 5 shows that the first measuring surface 30 extends in an angular range W1 around the king pin direction R10 in the circumferential direction U. In FIG. 5, the angular range W1 around the king pin direction R10 extends 180° in the circumferential direction. The circumferential direction U, the radial direction R and the king pin direction R10 form a cylinder coordinate system, as can be seen in FIG. 5.

REFERENCE LIST

1—king pin arrangement
10—king pin
12—king pin base section
14—king pin head
20—mounting element
22—base surface
30—first measuring surface
32—measuring projection
40—second measuring surface
50—first measuring sensor
51—evaluation unit
h—height difference
R—radial direction
R10—king pin direction
U—circumferential direction
W1—angular range

The invention claimed is:

1. A buckling angle measurement system, comprising:
a king pin arrangement;
a first measuring sensor; and
an evaluation unit;
wherein the king pin arrangement comprises a king pin and a mounting element, the king pin including a base section and a king pin head, wherein the king pin extends in a king pin direction, and wherein a positive king pin direction points from the base section to the king pin head;
wherein the mounting element comprises a receiving plate;
wherein the king pin is fastened directly and/or indirectly to the mounting element via the base section in a form-fitting, force-fitting and/or material-fitting manner;
wherein the king pin is fastened such that the king pin is rotationally fixed to the mounting element in a circumferential direction about the king pin direction;
wherein the mounting element and/or the king pin comprises a first measuring surface having an extension that has a continuous height profile in the direction of the king pin direction;
wherein the first measuring sensor is configured to interact metrologically with the first measuring surface;
wherein the first measuring sensor is an inductive sensor;
wherein the first measuring surface forms an end face of a measuring projection; and
wherein the measuring projection is formed integrally with the king pin, or wherein the measuring projection is integrally formed with the mounting element.

2. The buckling angle measurement system according to claim 1, wherein the first measuring surface extends in the circumferential direction.

3. The buckling angle measurement system according to claim 1, wherein the measuring projection extends from a base surface, and wherein the base surface has a normal which is at least substantially parallel to the king pin direction.

4. The buckling angle measurement system according claim 1, wherein the ratio of a maximum height difference of the first measuring surface to a minimum diameter of the king pin lies in a range of 0.03 to 0.3.

5. The buckling angle measurement system according to claim 4, wherein the range is from 0.06 mm/° to 0.25 mm/°.

6. The buckling angle measurement system according to claim 5, wherein the range is from 0.009 mm/° to 0.22 mm/°.

7. A king pin arrangement comprising a buckling angle measurement system according to claim 1, wherein the first measuring surface has a greater distance from the king pin direction in a radial direction than a second measuring surface.

8. A buckling angle measurement system, comprising:
a king pin arrangement;
a first measuring sensor; and
an evaluation unit;
wherein the king pin arrangement comprises a king pin and a mounting element, the king pin including a base section and a king pin head, wherein the king pin extends in a king pin direction, and wherein a positive king pin direction points from the base section to the king pin head;
wherein the mounting element comprises a receiving plate;
wherein the king pin is fastened directly and/or indirectly to the mounting element via the base section in a form-fitting, force-fitting and/or material-fitting manner;
wherein the king pin is fastened such that the king pin is rotationally fixed to the mounting element in a circumferential direction about the king pin direction;
wherein the mounting element and/or the king pin comprises a first measuring surface having an extension that has a continuous height profile in the direction of the king pin direction;
wherein the first measuring sensor is configured to interact metrologically with the first measuring surface;
wherein the first measuring sensor is an inductive sensor; and
wherein the first measuring surface extends in an angular range about the king pin direction in the circumferential direction, and wherein the angular range is at least 90°.

9. The buckling angle measurement system according to claim 8, wherein the angular range is at least 150°.

10. The buckling angle measurement system according to claim 9, wherein the angular range is at least 180°.

11. The buckling angle measurement system according to claim 8, wherein a ratio of a maximum height difference of the first measuring surface to a maximum angular range is in a range of 0.025 mm/° to 0.5 mm/°.

12. The buckling angle measurement system according to claim 11, wherein the ratio is in a range of 0.1 mm/° to 0.3 mm/°.

13. The buckling angle measurement system according to claim 12, wherein the ratio is in a range of 0.15 mm/° to 0.25 mm/°.

14. A buckling angle measurement system, comprising:
a king pin arrangement;
a first measuring sensor; and
an evaluation unit;
wherein the king pin arrangement comprises a king pin and a mounting element, the king pin including a base section and a king pin head, wherein the king pin extends in a king pin direction, and wherein a positive king pin direction points from the base section to the king pin head;
wherein the mounting element comprises receiving plate;
when the king pin is fastened direct and/or indirectly to the mounting element via the base section in a form-fitting, force-fitting and/or material-fitting manner;
wherein the king pin is fastened such that the king pin is rotationally fixed to the mounting element in a circumferential direction about the king pin direction;
wherein the mounting element and/or the king pin comprises a first measuring surface having an extension that has a continuous height profile in the direction of the king pin direction;
wherein the first measuring sensor is configured to interact metrologically with the first measuring surface;
wherein the first measuring sensor is an inductive sensor; and
wherein the mounting element and/or the king pin has/have a second measuring surface, which has a continuous height profile along an extension in the direction of the king pin direction and/or wherein the second measuring surface is configured similar to the first measuring surface.

15. The buckling angle measurement system according to claim 14, wherein the first measuring surface and the second measuring surface each form an end face of the measuring projection.

16. The buckling angle measurement system according to claim 15, wherein the first measuring surface and the second measuring surface are formed directly adjacent to one another.

17. The buckling angle measurement system according to claim 14, wherein the second measuring surface forms an end surface of a second measuring projection.

18. The buckling angle measurement system according to claim 14, wherein the first measuring surface is oppositely rising in comparison to the second measuring surface.

* * * * *